US011711675B2

(12) United States Patent
Stout et al.

(10) Patent No.: US 11,711,675 B2
(45) Date of Patent: Jul. 25, 2023

(54) INTERNET OF THINGS GATEWAY SYSTEMS AND METHODS FOR OIL AND GAS FIELDS

(71) Applicant: Weatherford Technology Holdings, LLC, Houston, TX (US)

(72) Inventors: Jimmy Dale Stout, Sugar Land, TX (US); Jason Scott Penner, Pearland, TX (US); Colin Albert Tait, Tomball, TX (US); Mehrzad Mahdavi, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 483 days.

(21) Appl. No.: 16/750,896

(22) Filed: Jan. 23, 2020

(65) Prior Publication Data

US 2020/0157922 A1 May 21, 2020

Related U.S. Application Data

(63) Continuation of application No. PCT/US2018/043728, filed on Jul. 25, 2018.
(Continued)

(51) Int. Cl.
*H04W 4/38* (2018.01)
*E21B 47/009* (2012.01)
(Continued)

(52) U.S. Cl.
CPC ............. *H04W 4/38* (2018.02); *E21B 47/009* (2020.05); *G16Y 10/00* (2020.01); *H04L 67/12* (2013.01); *H04W 4/80* (2018.02); *H04W 84/12* (2013.01)

(58) Field of Classification Search
CPC .... E21B 43/126; E21B 43/127; E21B 47/009; H04W 4/38; G16Y 10/00
See application file for complete search history.

(56) References Cited

U.S. PATENT DOCUMENTS 5,291,777 A * 3/1994 Chang .................. E21B 43/127
417/18
5,464,058 A * 11/1995 McCoy ................. G01L 5/0061
417/63
(Continued)

FOREIGN PATENT DOCUMENTS

CN 102541026 A * 7/2012
CN 205844898 U * 12/2016
(Continued)

OTHER PUBLICATIONS

International Search Report in related application PCT/US2018/043728 dated Oct. 30, 2018.
(Continued)

*Primary Examiner* — Robert E Fuller
(74) *Attorney, Agent, or Firm* — Cabello Hall Zinda, PLLC

(57) ABSTRACT

Certain aspects of the present disclosure provide for wireless sensor packages to monitor various oilfield equipment health status, such as bearing wear and detect out-of-balance condition on reciprocating rod lifts (RRLs). Equipment health data can be collected, analyzed and stored by an IoT gateway, which is a small form-factor, ruggedized, low-power Intel processor computer running a novel message-oriented middleware software stack that leverages the MQTT protocol. Data may subsequently be transmitted to a cloud service via the internet via to a datacenter through SCADA, for analysis and action.

20 Claims, 3 Drawing Sheets

Related U.S. Application Data

(60) Provisional application No. 62/536,813, filed on Jul. 25, 2017.

(51) Int. Cl.
*H04L 67/12* (2022.01)
*G16Y 10/00* (2020.01)
*H04W 4/80* (2018.01)
*H04W 84/12* (2009.01)

(56) References Cited

U.S. PATENT DOCUMENTS

| | | | |
|---|---|---|---|
| 7,032,659 B2 | 4/2006 | Barnes et al. | |
| 9,080,438 B1* | 7/2015 | McCoy | E21B 47/008 |
| 2006/0120217 A1 | 6/2006 | Wu et al. | |
| 2010/0042458 A1 | 2/2010 | Rashid et al. | |
| 2013/0300574 A1 | 11/2013 | Gillette, II | |
| 2014/0237487 A1 | 8/2014 | Prasanna et al. | |
| 2015/0142319 A1* | 5/2015 | McCoy | G01L 5/0061 |
| | | | 702/9 |
| 2015/0355216 A1* | 12/2015 | Girardeau | G01H 11/08 |
| | | | 73/514.29 |
| 2015/0369013 A1* | 12/2015 | Weatherhead | E21B 41/00 |
| | | | 700/275 |
| 2017/0074089 A1 | 3/2017 | Agarwal et al. | |
| 2017/0363088 A1 | 12/2017 | Nguyen et al. | |
| 2018/0016889 A1 | 1/2018 | Mcdonald et al. | |
| 2018/0019983 A1* | 1/2018 | Tissot | G06F 21/602 |
| 2018/0298744 A1 | 10/2018 | Ebrahimi et al. | |
| 2018/0300124 A1* | 10/2018 | Malladi | G06F 9/542 |
| 2019/0012492 A1* | 1/2019 | Pons | G06G 7/122 |
| 2019/0204467 A1 | 7/2019 | Curt et al. | |

FOREIGN PATENT DOCUMENTS

| | | |
|---|---|---|
| CN | 206224577 U | 6/2017 |
| CN | 108194056 A * | 6/2018 |
| WO | 2017035536 A1 | 3/2017 |
| WO | 2018165352 A1 | 9/2018 |

OTHER PUBLICATIONS

Khan: "A Reliable Internet of Things Based Architecture for Oil and Gas Industry", 2017 19th International Conference on Advanced Communication Technology (Icactl Global IT Research Institute—GIRi, Feb. 19, 2017 (Feb. 19, 2017), pp. 705-710.

First Office Action in counterpart Columbian Appl. NC2020/0001760, dated Nov. 16, 2022, 13-pgs.

SAS. "Improve artificial lift strategy, reliability and efficiency with predictive analytics." Solution Brief. 2015. sas com/bilgas. 2 pages.

Southern, David J. and Control Microsystems, Inc. "Multi-Wellpad Distributed Production Optimization Architecture." Gas Well Deliquification Workshop, Feb. 27-Mar. 2, 2011, Denver, CO. pp 1-35.

Southern, David J. et al. "The Wireless Wellhead." Gas Well Deliquification Workshop, Feb. 22-24, 2010, Denver, CO. pp. 1-33.

Weatherford. "CygNet® SCADA Platform." Brochure. 2017-2018 Weatherford. 8 pages.

Weatherford. "WellPilot® Controllers for Rod Pump Optimization." 2016-2017. pp. 1-12.

Weatherford. "WellPilot® Flow Control Technology." Brochure. 2018 Weatherford. 8 pages.

Second Office Action in counterpart Columbian Appl. NC2020/0001760, dated Mar. 10, 2023, 16-pgs.

* cited by examiner

INTERNET OF THINGS GATEWAY SYSTEMS AND METHODS FOR OIL AND GAS FIELDS

CROSS-REFERENCE TO RELATED APPLICATIONS

This application is a continuation of PCT International Application PCT/US2018/043728, filed Jul. 25, 2018, which claims benefit of U.S. Provisional Application Ser. No. 62/536,813, filed Jul. 25, 2017, the contents of both applications are incorporated herein by reference in their entirety.

BACKGROUND OF THE DISCLOSURE

Field of the Disclosure

Aspects of the present disclosure generally relate to hydrocarbon production, more particularly, to implementation of wireless sensor packages to monitor oilfield equipment.

Description of the Related Art

In oil and gas upstream exploration and production (E&P), Supervisory Control and Data Acquisition (SCADA) systems have been deployed for many decades to acquire data from field assets, transmit the data to SCADA control centers, and provide control feedback to the assets in the field based on set points provided by the applications connected to the SCADA systems. These systems operate mostly based on proprietary protocols (like ModBus), gathering units, and specialized communication mechanisms. This process has led to expensive and proprietary systems. Upgrades to this architecture require expensive and expert personnel on site.

Thus, there is a need for apparatus and methods of monitoring oilfield equipment.

SUMMARY OF THE DISCLOSURE

In at least one aspect, the disclosure relates to integrated methods for data acquisition, analysis and transmission from oilfield field assets to production optimization and back office systems using the modern systems and protocols associated with the Internet of Things (referred to hereinafter as "IoT").

In at least one aspect, the disclosure relates to methods and systems to employ IoT devices, acquire data from these IoT devices, transmit data to gateways that network with one another, the gateways then send the data to the Cloud for further analysis and visualization at the data centers or in systems hosted in the Cloud.

Embodiments of the present disclosure provide a system for an oilfield operation. The system includes a pumping unit, a sensor positioned to measure one or more parameters of the pumping unit, and an IoT (Internet of Things) gateway including communication protocols for the sensor.

Embodiments of the present disclosure provide a method for operating a pumping unit for a wellbore. The method includes measuring one or more parameters of the pumping unit using a sensor attached to the pumping unit, transmitting sensor data from the sensor to an IoT gateway, and analyzing sensor data to determine health status of the pumping unit.

Embodiments of the present disclosure provide a non-transitory computer-readable medium for operating a pumping unit for a wellbore. The computer-readable medium includes instructions executable by one or more processors to receive sensor data from a sensor coupled to the pumping unit through a wireless protocol, analyze received sensor data to determine health status of the pumping unit, and communicate with a controller connected to the pumping unit and a Supervisory Control and Data Acquisition (SCADA) system via the Cloud.

This summary is provided to introduce a selection of embodiments that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

So that the manner in which the above-recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

The present disclosure relates to IoT devices, data acquisition from these IoT devices, transmission of data to gateways that network with one another, wherein the gateways are operable to send the data to the Cloud for further analysis and visualization at the data centers or in systems hosted in the Cloud.

The confluence of new sensors, IoT, and the Cloud has enabled new and unique methods to digitize the oilfield through IoT devices. In the following, a method is described, based on IoT technology, to streamline the process. The solution provides open, standardized Application Programming Interfaces (APIs) and utilizes open, modern IoT protocols. The methods herein provide the capability to acquire wired and wireless sensor data, analyze the data at the edge of the architecture, and reliably replicate data and results to an oil and gas production optimization system. These back-end optimization systems can be hosted on-premises in a customer datacenter, or hosted in the Cloud. The disclosed process, involving sensors, pumping unit controllers, IoT devices, IoT gateways, communication protocols, controls, and IoT applications are described in FIG. 1.

Figure 1:
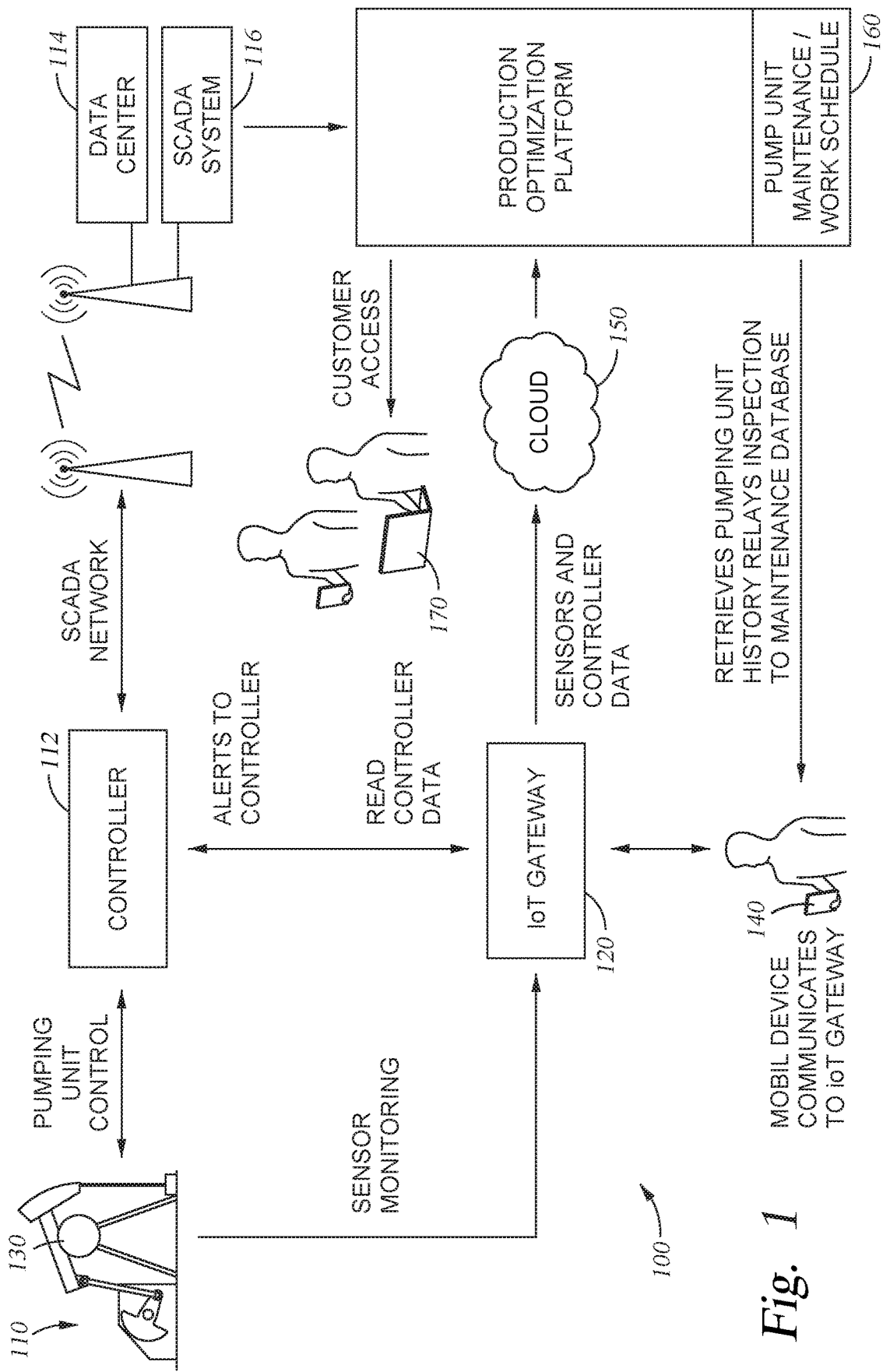
FIG. 1 is a system block diagram for the Solution for Production Optimization in accordance with the present disclosure.

FIG. 1 is schematic block diagram of a system 100 in accordance with the present disclosure. The system 100 includes a pumping unit 110. The pumping unit 110 may be positioned over a wellhead of a wellbore for direct production or artificial lift of hydrocarbon production. The pumping unit 110 shown in FIG. 1 is a reciprocating rod lift (RRL). Embodiments of the present disclosure may be used on other type of pumping unit, such as vertical pumping units. The pumping unit 110 is connected to a controller 112, which controls the operation of the pumping unit 110. The controller 112 may be connected through a SCADA next work to a datacenter 114 and a SCADA system 116 that monitors the operation of the pumping unit 110.

The pumping unit 110 includes various moving components. The relative positions of the moving components may cause the pumping unit 110 to become off-balance, thus affecting the operation. During operation, the pumping unit 110 may develop undesirable conditions, such as pump-off, a phenomenon that reduces the pump efficiency. Additionally, the moving components are susceptible to wear down over time, thereby leading to shut down of the pumping unit 110.

In some embodiments, one or more sensors 130 are disposed on pumping unit 110 to measure various parameters of the pumping unit 110. In some embodiments, the one or more sensors 130 may be disposed on a wrist pin cap close to wrist pin bearings, bearings in the tail, bearings in the saddle, and/or bearings in the gearbox in a reciprocating rod lift. In some embodiments, the one or more sensors 130 may be disposed on the crank arm, the walking beam, or the drive motor of a reciprocating rod lift.

The sensor data can be used to determine the operation condition, health status of the pumping unit 110, or other applications related to the production in the wellbore. The one or more sensors 130 may be attached to components of the pumping unit 110 to measure vibration, displacement, load, position, or other suitable parameters of the pumping unit 110.

In some embodiments, the sensor 130 includes at least one processor, one or more sensing devices, an analog-to-digital converter, a time-to-frequency-domain converter, and memory. The sensor 130 may further including an input/output (I/O) interface, which may be configured for wired and/or wireless implementations (e.g., Bluetooth or WiFi in accordance with IEEE 802.11).

In some embodiments, the sensor 130 includes noise-filtering means that is suitable for the oil and gas industry. For example, the sensor 130 includes a signal processing means configured to process signals from motors and pumps with revolution rates in a range between about 1 Hz to about 1 k Hz. In some embodiments, an analog filter (e.g., a low-pass filter, which may also be referred to as an anti-aliasing filter) may be applied before the analog-to-digital converter in the sensor in an effort to filter out high frequencies outside the frequency band of interest, before these higher frequencies are aliased into the passband by the act of sampling. For certain aspects, a digital filter (e.g., a low-pass filter or a notch filter) may be applied after the analog-to-digital converter in an effort to remove unwanted frequencies (e.g., higher frequencies) from the frequency band of interest. The digital filter may be implemented with a digital signal processor (DSP), which may be a standalone processor or part of another processor.

In some embodiment, the sensors 130 are embedded in wellsite equipment on the electronic boards with a variety of wireless protocols including Bluetooth protocol and Wi-Fi protocol in accordance with IEEE 802.11. In an embodiment, the sensors 130 are battery-powered wireless sensors at the wellsite. The sensors 130 may be rugged, easy-to-install sensor packages used to detect characteristics, such as bearing wear and out-of-balance conditions, and communicate the data to the Internet of Things (IoT) gateway, such as Weatherford Internet of Things (IoT), via wireless protocol, such as Wi-Fi.

In some embodiments, the electronic boards, in which the sensors 130 are embedded, include modules to perform signal processing algorithms to filter out the noise typical in the oil field environment from measurements of the sensors 130. In some embodiments, the electronic board comprises a time-to-frequency-domain converter, the time-to-frequency-domain converter implements a Fast Fourier Transform (FFT) or a Discrete Fourier Transform (DFT). In some embodiments, the electronic board is capable of performing Kalman filtering.

The noise-filtering means enable deployment of wireless sensors capable of reliably measuring the deterioration of bearing condition, and to report out-of-balance conditions. There are significant safety and efficiency benefits associated with this approach.

The system 100 further includes an IoT gateway 120 for communication with the one or more sensors 130. In some embodiments, the IoT gateway 120 also includes communication protocols that allow the IoT gateway 120 to communicate with mobile device 140, the controller 112, or a production optimization platform 160. The production optimization platform 160 is located remotely at a customer site and the production optimization platform 160 may be accessible to customers through remote stations 170. The IoT gateway 120 communicates with the production optimization platform 160 via the Cloud 150. An operator can monitor and control the pumping unit 110 using the production optimization platform 160 via the Cloud 150 and the IoT gateway 120. In some embodiments, the SCADA system 116 also communicates with the production optimization platform 160.

In some embodiments, the system 100 provides a feedback loop to control and monitor the pumping unit 110 through the one or more sensors 130 and the IoT gateway 120.

In some embodiments, the feedback loop includes the one or more sensors 130 and the IoT gateway 120. The IoT gateway 120 acquires sensor data from the one or more sensors 130, analyzes the sensor data and dispatches alerts or other signals to the controller 112.

In some embodiments, the feedback loop includes the one or more sensors 130, the IoT gateway 120, and the production optimization platform 160. The IoT gateway 120 acquires sensor data from the one or more sensors 130, transmits the sensor data to the production optimization platform 160. The production optimization platform 160 analyzes the sensor date and generates alerts or other information and sends related information back to the IoT gateway 120. The IoT gateway 120 then dispatches alerts or other signals to the controller 112.

In some embodiments, the feedback loop includes the one or more sensors 130, the IoT gateway 120, the production optimization platform 160, and the SCADA system 116. The IoT gateway 120 acquires sensor data from the one or more sensors 130, transmits the sensor data to the production optimization platform 160. The production optimization platform 160 analyzes the sensor data and generates alerts or other information. The SCADA system 116 may acquire information from the production optimization platform 160 and dispatch alerts or other commands to the controller 112.

Figure 2:
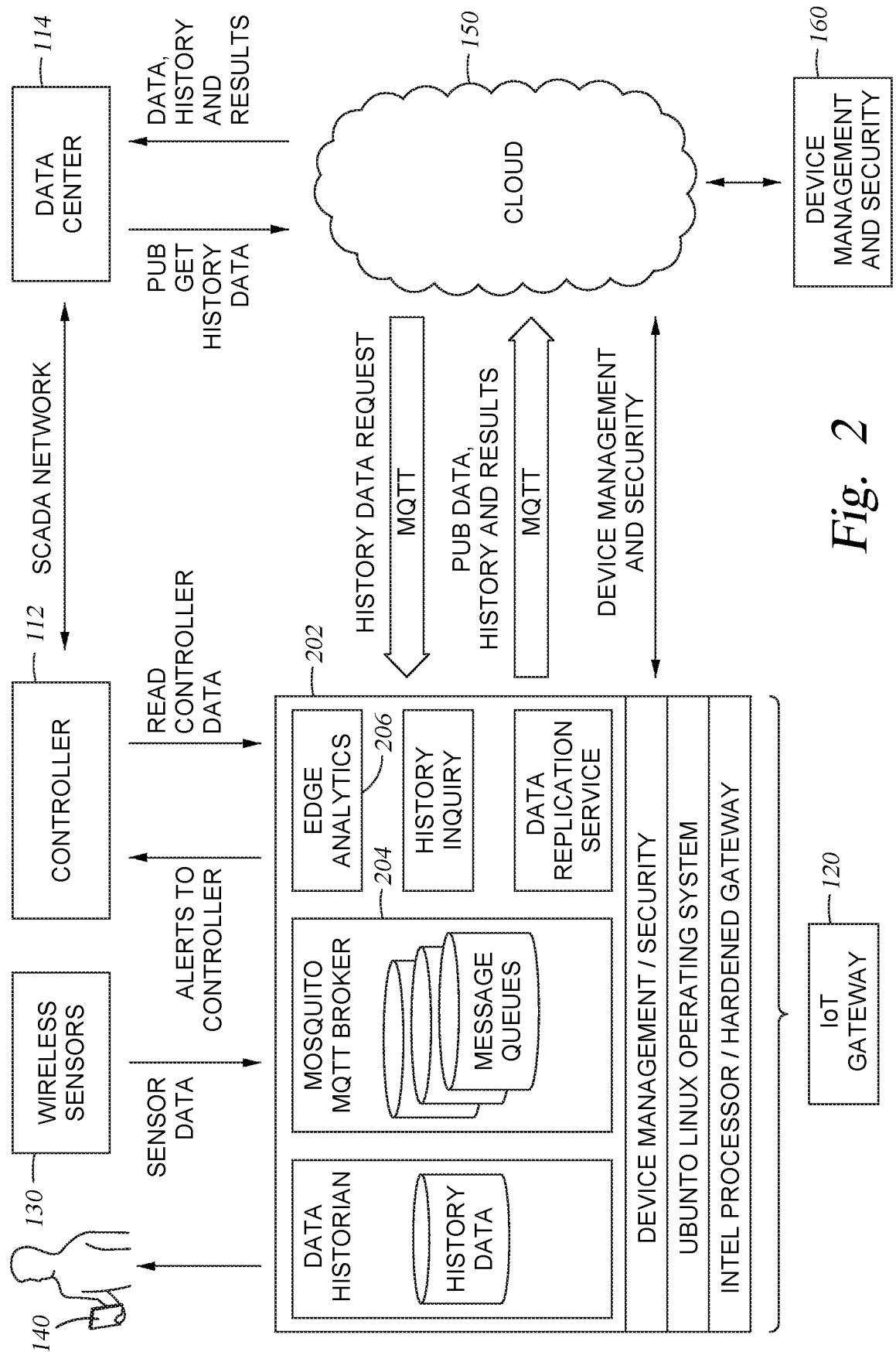
FIG. 2 is a system block diagram for Architecture for the Solution for Production Optimization in accordance with the present disclosure.

FIG. 2 is a system block diagram for Architecture for the Solution of the system 100 in accordance with the present disclosure. As shown in FIG. 2, the IoT gateway 120 includes protocols and software technology stack 202 to be integrated into existing enclosures, or deployed in a separate enclosure at the wellsite.

In some embodiments, the IoT gateway 120 may be a small-form-factor, ruggedized, low-power Intel processor computer running a reliable message-oriented middleware software stack using the Message Queuing Telemetry Transport (MQTT) protocol. Technology stack indicates the combination of programming languages, tools and frameworks that the developers use to create web and mobile applications. There are two main components to any application, known as client side and server side, also referred to as front end and back end. Alternatively, the IoT gateway 120 can be any suitable hardware and software combination.

Figure 3:
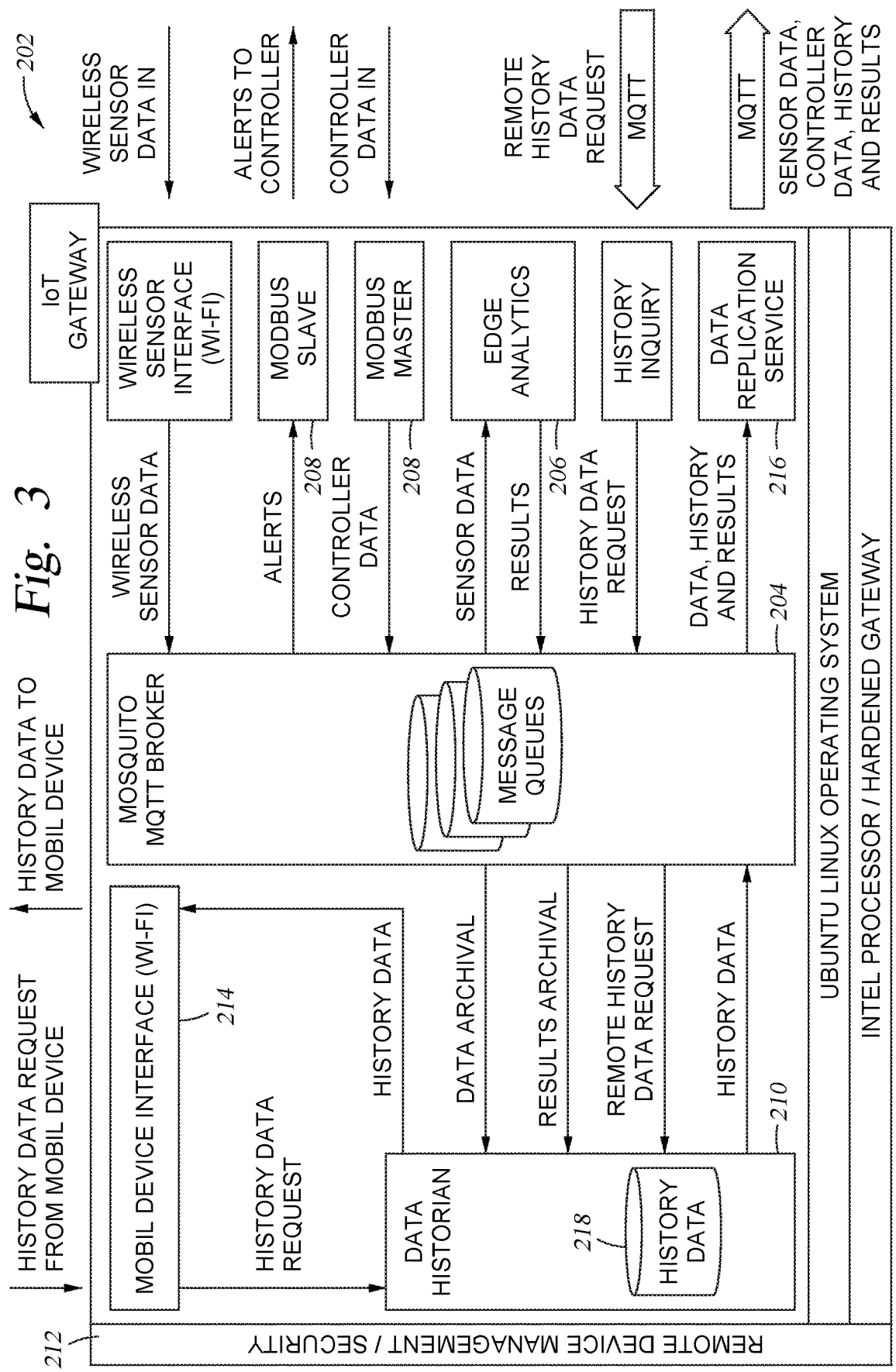
FIG. 3 is a block diagram for the IoT Gateway in accordance with the present disclosure.

FIG. 3 schematically demonstrates more details of the technology stack 202 of the IoT Gateway 120 developed for the oil and gas applications.

In some embodiments, the IoT gateway 120 includes a Mostquito MOTT broker 204, which is a Message Oriented Middleware using MQTT for reliable data replication. The Mosquito MQTT broker 204 is the "publish-and-subscribe" message hub for the IoT gateway 120.

In some embodiments, the IoT gateway 120 provides interfaces to wireless sensors, such as the sensors 130, for measuring field data, such as, for example, but not limited to, pumping unit health.

In some embodiments, the IoT gateway 120 hosts an edge analytics 206 for processing raw data and producing health indicators, for example bearing condition (wear indicator) and out-of-balance condition.

In some embodiments, the IoT gateway 120 provides a bi-directional interface (shown in FIG. 3) for pumping unit controllers, such as the controller 112. This interface 208 provides the various communication capabilities. For example, pumping unit controllers, such as the controller 112, can poll the IoT gateway 120 on a periodic basis and the IoT gateway 120 responds with alerts and pumping unit health status indicators. The alerts and indicators are transmitted to a pumping unit controller, such as the controller 112, via the ModBus protocol (connected via RS232, RS485 or Ethernet) and back to a datacenter 114 through a traditional SCADA network.

The IoT gateway 120 further provides other data services, for example, edge analytics 206, data historian 210, data transmission channels (either over the internet to public or private cloud-based systems or through existing SCADA networks to datacenters), and remote software systems 212 for data visualization, analytics, production optimization, and workflow management.

In some embodiments, the IoT gateway 120 also provides a tablet interface 214 for access at the wellsite to data and analytics by service crews through a handheld user device such as, for example, an iPad™ running an application designed for such purpose.

In some embodiments, pumping unit controllers, such as the controller 112, can be polled by the IoT gateway 120 on a periodic basis. The data collected by the IoT gateway 120 is published to the Mosquito MQTT broker 204 and subsequently replicated by software, such as data replication service 216, to a Production Optimization (PO) system, such as the production optimization platform 160. In some embodiments, the production optimization platform 160 is Weatherford's ForeSite™ platform. The production optimization platform 160 may be in the cloud or hosted in a customer datacenter. This scenario does not require an expensive SCADA network, and it leverages the Internet for data transmission.

In some embodiments, the IoT gateway 120 also stores the data collected from sensors and connected controllers in a history database 218 on the IoT gateway 120.

In some embodiments, the IoT gateway 120 can store volumes of data, including analytics results, locally; and can respond to query requests for data from the remote production optimization system, or from a technician using a handheld device, such as an iPad™, at the well site.

In some embodiments, the middleware in the IoT gateway 120 is designed as a Micro-Service architecture and leverages MQTT publish and subscribe for reliable store and forward of raw data, results, history and commands.

In some embodiments, the IoT gateway 120 can be managed by remotely using secure cloud-base management platform.

In some embodiments, the IoT gateway 120 can be rail mounted in a custom enclosure so that it can withstand harsh environments found in the oilfields.

The IoT gateway 120 can be used by customers who have controllers, but have not been able to invest in SCADA due to cost and complexity. The IoT gateway 120 can also be used to augment traditional SCADA systems, as these systems typically cannot support wireless sensors that utilize protocols other than ModBus—modern protocols such as TCP/IP, MQTT and HTTP/REST in the case of a particular embodiment of the Gateway.

The IoT gateway 120 can network with one another via a variety of networking techniques and protocols. This feature allows transmission of data through gateways to land on the nearest backhaul for transmission to the Cloud.

As shown in FIG. 3, data transmitted to the Cloud can be analyzed by the applications in the IoT gateway 120, the SCADA system 116, or the production optimization platform 160. The feedback loop to the IoT gateway 120 and the industrial equipment controls can provide autonomous operations.

One benefit of the present disclosure includes establishment of a field IoT platform capable of more autonomous operation through edge analytics, exception reporting, and access to raw data for further analysis. Another benefit of the present disclosure is compatibility and integration with existing SCADA systems. Still another benefit of the present disclosure is reduction of maintenance costs and non-productive time through accurate, reliable and improved monitoring of pumping unit health. Another benefit of the present disclosure is Reduction in HSE incidents related to traditional hazardous procedures for diagnosing and remediating pumping unit operational conditions. An additional benefit of the present disclosure is it presents a path to long-term SCADA replacement by moving to Production 4.0 technologies.

Embodiments of the present disclosure provide a system for an oilfield operation. The system includes a pumping unit, a sensor positioned to measure one or more parameters of the pumping unit, and an IoT (Internet of Things) gateway including communication protocols for the sensor.

In one or more embodiments, the sensor is embedded in an electronic board capable of signal processing and performing filter functions.

In one or more embodiments, the electronic board comprises a time-to-frequency-domain converter, the time-to-frequency-domain converter implements a Fast Fourier Transform (FFT) or a Discrete Fourier Transform (DFT).

In one or more embodiments, the electronic board is capable of performing Kalman filtering.

In one or more embodiments, the system further includes an electronic board configured to transmit wireless signals, wherein the electronic board is connected to the sensor.

In one or more embodiments, the electronic board is configured to transmit signal through Bluetooth technology or Wi-Fi technology.

In one or more embodiments, the IoT gateway and the sensor communicate through wireless technology.

In one or more embodiments, the IoT gateway includes a technology stack applied to the oil and gas applications including communication protocols for existing production pumps, controllers, data historian, message queuing/brokers, and edge analytics.

In one or more embodiments, the IoT gateway includes a data transmission means connected to the Cloud.

In one or more embodiments, the electronic board includes a signal processing means configured to process signals from motors and pumps with revolution rates in a range between about 1 Hz to about 1 k Hz.

In one or more embodiments, the system further includes a controller connected to the pumping unit, wherein the IoT gateway is connected to the controller to provide a feedback loop for maintenance and/or control of the pumping unit.

In one or more embodiments, the sensor comprises a load sensor and a position sensor, and the load sensor and the position sensor are configured to apply a dynamometer card for determining health status of the pumping unit.

In one or more embodiments, the IoT gateway includes an edge analytics for processing raw data from the sensor and producing health indicators for bearing condition and out-of-balance condition.

In one or more embodiments, the IoT gateway comprises a small-form-factor, ruggedized, low-power processor computer running a message-oriented middleware software stack using Message Queuing Telemetry Transport (MQTT) protocol.

Embodiments of the present disclosure provide a method for operating a pumping unit for a wellbore. The method includes measuring one or more parameters of the pumping unit using a sensor attached to the pumping unit, transmitting sensor data from the sensor to an IoT gateway, and analyzing sensor data to determine health status of the pumping unit.

In one or more embodiments, analyzing sensor data is performed in the IoT gateway.

In one or more embodiments, the method further includes processing the sensor data and producing health indicators for bearing condition and out-of-balance condition.

In one or more embodiments, the method further includes applying a mobile device in communication with the IoT gateway to acquire data from the sensor.

In one or more embodiments, the method further includes communicating operating commands to a controller connected to the pumping unit through the IoT gateway.

Embodiments of the present disclosure provide a non-transitory computer-readable medium for operating a pumping unit for a wellbore. The computer-readable medium includes instructions executable by one or more processors to receive sensor data from a sensor coupled to the pumping unit through a wireless protocol, analyze received sensor data to determine health status of the pumping unit, and communicate with a controller connected to the pumping unit and a Supervisory Control and Data Acquisition (SCADA) system via the Cloud.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

While the foregoing is directed to aspects of the present disclosure, other and further aspects of the disclosure may be devised without departing from the basic scope thereof, and the scope thereof is determined by the claims that follow.

The invention claimed is:

1. A system for monitoring and controlling an oilfield operation using an Internet-based network and a data-based network associated with a remote platform, the system comprising:
    a pumping unit;
    a sensor positioned to measure one or more parameters of the pumping unit, the sensor being configured to communicate using a first communication protocol different than a second communication protocol of the data-based network;
    an IoT (Internet of Things) gateway being configured to communicate with the sensor using the first communication protocol for the sensor, the IoT gateway being configured to communicate with the remote platform via the Internet-based network using a third communication protocol; and
    a controller connected to the pumping unit, the controller being configured to communicate with the remote platform using the second communication protocol of the data-based network and being configured to provide maintenance and control of the pumping unit,
    wherein the IoT gateway is connected to the controller and is configured to communicate with the controller using a fourth communication protocol, and
    wherein at least the sensor and the IoT gateway are configured to provide a feedback loop for the controller to provide the maintenance and control of the pumping unit.

2. The system of claim 1, wherein the sensor is embedded in an electronic board capable of signal processing and performing filter functions.

3. The system of claim 2, wherein the electronic board comprises a time-to-frequency-domain converter, the time-to-frequency-domain converter implements a Fast Fourier Transform (FFT) or a Discrete Fourier Transform (DFT).

4. The system of claim 2, wherein the electronic board is capable of performing Kalman filtering.

5. The system of claim 2, wherein the electronic board includes a signal processing means configured to process signals from motors and pumps with revolution rates in a range between about 1 Hz to about 1 k Hz.

6. The system of claim 1, further comprising:
    an electronic board configured to transmit wireless signals, wherein the electronic board is connected to the sensor.

7. The system of claim 1, wherein the IoT gateway and the sensor communicate using the first communication protocol through wireless technology.

8. The system of claim 1, wherein the IoT gateway includes a technology stack applied to oil and gas applications including the third communication protocol for communicating with existing production pumps, controllers, data historian, message queuing/brokers, and edge analytics.

9. The system of claim 1, wherein the IoT gateway includes a data transmission means connected to a Cloud-based system and configured to communicate via the Internet-based network using the third communication protocol.

10. The system of claim 1, wherein the sensor comprises a load sensor and a position sensor, and wherein sensor data of the load sensor and the position sensor is used for a dynamometer card for determining health status of the pumping unit.

11. The system of claim 10, wherein the IoT gateway includes an edge analytics for processing raw data from the sensor and producing health indicators for bearing condition and out-of-balance condition of the pumping unit.

12. The system of claim 1, wherein the IoT gateway comprises a small-form-factor, ruggedized, low-power processor computer running a message-oriented middleware software stack using Message Queuing Telemetry Transport (MQTT) protocol for the third communication protocol.

13. The system of claim 1, wherein the IoT gateway includes an edge analytics for processing raw data from the sensor and producing health indicators for bearing condition and out-of-balance condition of the pumping unit.

14. The system of claim 1, wherein:
the first communication protocol is selected from the group consisting of a wireless protocol, a Bluetooth protocol, a Wi-Fi protocol, an IoT protocol, a Transmission Control Protocol/Internet Protocol (TCP/IP) protocol, a Message Queuing Telemetry Transport (MQTT) protocol, and a Hypertext Transfer Protocol/Representational State Transfer (HTTP/REST) protocol;
the second communication protocol is selected from the group consisting of a Supervisory Control and Data Acquisition (SCADA) system protocol and a ModBus protocol;
the third communication protocol is a MQTT protocol; and/or
the fourth communication protocol is selected from the group consisting of a SCADA system protocol and a ModBus protocol.

15. The system of claim 1, wherein the IoT gateway comprises a mobile device interface configured to communicate with a mobile device using the first communication protocol.

16. A method for operating a pumping unit for a wellbore, comprising:
measuring one or more parameters of the pumping unit using a sensor attached to the pumping unit, the sensor being configured to communicate using a first communication protocol different than a second communication protocol of a data-based network;
transmitting sensor data from the sensor to an IoT gateway by using the first communication protocol, the IoT gateway being configured to communicate with a remote platform via an Internet-based network using a third communication protocol and being configured to communicate with a controller using a fourth communication protocol;
analyzing the sensor data to determine health status of the pumping unit using at least one of the IoT gateway and the remote platform;
providing maintenance and control of the pumping unit using the controller based on the determined health status; and
providing a feedback loop for the controller to provide the maintenance and control of the pumping unit using at least the sensor and the IoT gateway.

17. The method of claim 16, wherein analyzing the sensor data is performed in the IoT gateway.

18. The method of claim 16, wherein analyzing the sensor data comprises:
processing the sensor data and producing health indicators for bearing condition and out-of-balance condition of the pumping unit.

19. The method of claim 16, further comprising:
applying a mobile device in communication with the IoT gateway via the Internet-based network to acquire data from the sensor.

20. The method of claim 16, wherein providing the feedback loop comprises:
communicating operating commands to the controller through the IoT gateway.

* * * * *